(12) United States Patent
Zguris et al.

(10) Patent No.: US 7,160,824 B2
(45) Date of Patent: Jan. 9, 2007

(54) GLASS COMPOSITIONS

(75) Inventors: George Zguris, Canterbury, NH (US); John Windisch, Corvallis, OR (US); Patrick Svoboda, Philomath, OR (US); Yuri Vulfson, Corvallis, OR (US)

(73) Assignee: Evanite Fiber Corporation, Corvallis, OR (US)

( * ) Notice: Subject to any disclaimer, the term of this patent is extended or adjusted under 35 U.S.C. 154(b) by 280 days.

(21) Appl. No.: 10/630,546

(22) Filed: Jul. 29, 2003

(65) Prior Publication Data

US 2004/0096670 A1    May 20, 2004

Related U.S. Application Data

(60) Provisional application No. 60/399,583, filed on Jul. 29, 2002.

(51) Int. Cl.
C03C 13/00 (2006.01)
C03C 3/091 (2006.01)
C03C 3/085 (2006.01)

(52) U.S. Cl. .......................... 501/35; 501/59; 501/66; 501/68

(58) Field of Classification Search .............. 501/35, 501/37, 55, 72, 95, 57, 58, 59, 65, 66, 67, 501/68, 69, 70, 71
See application file for complete search history.

(56) References Cited

U.S. PATENT DOCUMENTS

| | | | |
|---|---|---|---|
| 2,726,161 A | 12/1955 | Beck et al. | |
| 2,774,675 A | 12/1956 | Slayter | |
| 2,870,030 A | 1/1959 | Stradley et al. | |
| 3,272,657 A | 9/1966 | Zenczak | |
| 3,391,055 A | 7/1968 | Veres | |
| 3,419,403 A | 12/1968 | Searight et al. | |
| 3,450,571 A | 6/1969 | Zenczak | |
| 3,537,868 A * | 11/1970 | Kosaka | 501/7 |
| 3,560,177 A * | 2/1971 | De LAJarte et al. | 65/472 |
| 3,732,181 A | 5/1973 | Ray et al. | |
| 3,845,737 A | 11/1974 | Heussy et al. | |
| 3,892,620 A | 7/1975 | Heussy | |
| 3,989,579 A | 11/1976 | Sheldon | |
| 4,113,927 A | 9/1978 | Johnson et al. | |
| 4,233,379 A | 11/1980 | Gross et al. | |
| 4,237,083 A | 12/1980 | Young et al. | |
| 4,472,030 A * | 9/1984 | Tachibana et al. | 501/37 |
| 4,522,876 A | 6/1985 | Hiers | |
| 5,091,275 A | 2/1992 | Brecht et al. | |
| 5,180,647 A | 1/1993 | Rowland et al. | |
| 5,304,516 A | 4/1994 | Clifford | |
| 5,753,571 A | 5/1998 | Donohue | |
| 5,817,586 A * | 10/1998 | Harada et al. | 501/17 |
| 5,962,355 A | 10/1999 | Mattson | |
| 5,985,488 A | 11/1999 | Mitate et al. | |
| 6,261,335 B1 | 7/2001 | Kern et al. | |
| 6,403,507 B1 | 6/2002 | Naumann et al. | |
| 6,531,248 B1 | 3/2003 | Zguris et al. | |
| 6,656,861 B1 | 12/2003 | Bauer et al. | |
| 2004/0091777 A1 | 5/2004 | Lam et al. | |
| 2004/0093704 A1 | 5/2004 | Marlow | |
| 2004/0094379 A1 | 5/2004 | Jahns et al. | |
| 2004/0095249 A1 | 5/2004 | Zaccaria | |
| 2004/0096670 A1 | 5/2004 | Zguris et al. | |
| 2004/0096711 A1 | 5/2004 | Zinser et al. | |

FOREIGN PATENT DOCUMENTS

| | | |
|---|---|---|
| DE | 1 298 680 | 5/1964 |
| EP | 0439788 | 8/1991 |
| JP | 61096659 | 5/1986 |
| JP | 61128459 | 6/1986 |
| JP | 63048744 | 3/1988 |
| JP | 1071060 | 3/1989 |
| JP | 4073863 | 3/1992 |
| JP | 5151947 | 6/1993 |
| JP | 5283053 | 10/1993 |
| JP | 6223798 | 8/1994 |
| JP | 6302313 | 10/1994 |
| JP | 7029560 | 1/1995 |
| JP | 7201310 | 8/1995 |
| JP | 8195194 | 7/1996 |
| JP | 9082303 | 3/1997 |
| JP | 9092252 | 4/1997 |
| JP | 9134716 | 5/1997 |
| JP | 11016560 | 1/1999 |
| JP | 11260335 | 9/1999 |
| JP | 11307074 | 11/1999 |
| JP | 2000268796 | 9/2000 |

(Continued)

OTHER PUBLICATIONS

Lam et al., "Influence of Residual Elements in Lead and Expander Materials on the Oxygen- and/or Hydrogen-Gassing Rates of Lead-Acid Batteries," Investigation Report ET/IR448R, ALABC Project N 3.1, 30 pp. (Jul.-Dec. 2001).

(Continued)

*Primary Examiner*—Jennifer C. McNeil
*Assistant Examiner*—G. Blackwell
(74) *Attorney, Agent, or Firm*—Klarquist Sparkman, LLP

(57) ABSTRACT

Disclosed are glass compositions and glass fibers formed from certain embodiments of the disclosed glass compositions. Certain embodiments of the glass compositions include, among other components, bismuth oxide. Certain embodiments of the glass composition include about 0.5–30% bismuth oxide of the composition by weight and silica oxide at about 54–70% of the composition by weight. Embodiments of the glass compositions may also include other components. For example, zinc oxide can make up about 0.01–5% of the composition by weight.

2 Claims, No Drawings

FOREIGN PATENT DOCUMENTS

| JP | 2001176481 | 6/2001 |
|---|---|---|
| JP | 2002110124 | 4/2002 |
| JP | 2002151033 | 5/2002 |
| JP | 2002151034 | 5/2002 |
| JP | 2002216733 | 8/2002 |
| JP | 2002304977 | 10/2002 |
| JP | 2003017030 | 1/2003 |
| WO | WO95/09131 | 4/1995 |
| WO | 01/46078 | 6/2001 |
| WO | 03/009029 | 1/2003 |
| WO | WO03/022764 | 3/2003 |
| WO | WO03/022766 | 3/2003 |
| WO | 04/011379 | 2/2004 |

OTHER PUBLICATIONS

Lam et al., "Influence of Residual Elements in Lead on the Oxygen- and/or Hydrogen-Gassing Rates of Lead-Acid Batteries," Investigation Report ET/IR526R, ALABC Project N 3.1, Final Report, 62 pp. (Jul. 2000-Jun. 2002).

"Bismuth—History, Background," Download from www.resource-world.net on Jul. 15, 2002, 11 pp.

"Visit to Exide Technologies, R&D Center, Azuquecade Henares, Sep. 17, 2002" Memo, Hollingsworth & Vose Company, A.K. Nicholson Research Laboratory, New Business Development Unit, 3 pp. (Sep. 17, 2002).

Lam et al., "Failure mode of valve-regulated lead-acid batteries under high-rate partial-state-of-charge operation," 10$^{th}$ Asian Battery Conference, 29 pp. (Sep. 3-5, 2003).

Lam et al., Presentation of "Influence of plate-processing conditions, electrolyte concentration and trace elements on the performance of VRLA batteries at high temperatures and under high-rate partial-state-of-charge operation," given at the 10$^{th}$ Asian Battery Conference, 25 pp. (Sep. 3-5, 2003).

Lam et al., "Influence of plate-processing conditions, electrolyte concentration and trace elements on the performance of valve-regulated lead-acid batteries at high temperatures and under high-rate partial-state-of-charge operation," Investigation Report ET/IR671R, ALABC Project TE-1, 32 pp. (Aug. 2003-Jan. 2004).

Osumi et al., "Development of additives in negative active material to suppress sulfation during high-rate-partial-state of charge," Progress Report No. 2, ALABC Project No. N5.2, 25 pp. (Mar. 30, 2004).

Nonwovens—Theory, Process, Performance & Testing Chapter 1: An Overview of Nonwovens and Chapter 2: Nonwoven Terminology, TAPPI Press, Atlanta, Georgia, pp. 1-10 and 14 (1993).

Witkowska, A. et al., "A Molecular Dynamics Study of Lead-Bismuth-Silicate Glasses," IEEE Transactions on Dielectrics and Electronic Insulation, vol. 8, No. 3, pp. 385-389 (Jun. 2001).

* cited by examiner

GLASS COMPOSITIONS

CROSS REFERENCE TO RELATED APPLICATION

This application claims the benefit of U.S. Provisional Patent Application No. 60/399,583, filed Jul. 29, 2002, which is also incorporated herein by reference.

FIELD

Disclosed are bismuth-containing glass compositions, glass fibers formed from the glass compositions, and applications of the same.

BACKGROUND

Two well-known glass fiber manufacturing methods are known as the rotary method and the flame blown method. Another well-known and widely used method is the CAT method, which is a modification of the rotary method. Manufacturing glass by these methods requires heating glass compositions past their melting temperatures into a working temperature range. Typical glass compositions used in making glass fibers have melting temperatures of about 2700° F. (about 1482° C.) and working temperatures (about 1427° C.). Existing compositions have relatively narrow working ranges, making the forming of glass fibers of desirable diameters and lengths difficult because it is difficult to maintain the glass compositions in the workable range. Additionally, the relatively high melting temperatures require large amounts of energy to melt the compositions, which can be very costly.

In addition, typical glass compositions used for making glass fibers have liquidus temperatures of about 1800° F. (about 982° C.). The liquidus temperature of typical compositions used for making glass fibers limits the useful life of fiberization equipment due to the high temperatures at which the equipment must operate. This is especially true when a spinner disc is employed in the fiberization equipment. A glass composition having a relatively low liquidus temperature also is useful for reducing or preventing crystallization of the glass during the fiberization process.

Glass fibers are used in a variety of applications. For example, glass fibers are used in several manners in batteries. Glass fibers are typically used as a separator that is preferably inserted between negative and positive plates of the battery. In addition, glass fibers are used as a part of a modified material mixed with a paste on the negative or positive plates of a battery. Further, glass fibers are used as a pasting paper that is applied to the surface of the plates to reduce the liberation of lead dust during manufacture.

Glass fibers tend to become brittle in humid environments, leach favorable and unfavorable components, and are unstable in acidic and/or alkaline environments. These characteristics of certain glass fibers can limit their usefulness in applications such as battery separators or filters. Ion leaching, for example, is a glass fiber surface phenomenon. The amount of ions lost from a glass fiber is proportional to the exposed surface area. Surface area considerations are typically greatest for glass fibers having diameters of less than about 5–7 μm. In some glass fibers certain metal oxide impurities (e.g., platinum oxide, iron oxide) leach out of the fibers and have a detrimental effect on the life of the battery.

Known glass compositions do not meet desired characteristics.

SUMMARY

Disclosed are glass compositions and glass fibers formed from certain embodiments of the disclosed glass compositions. Particular embodiments of the disclosed compositions and fibers have broad working temperature ranges and relatively low melting temperatures that can prolong the useful life of fiberization equipment and decrease the costs associated with producing glass fibers. Moreover, particular embodiments of the disclosed compositions and fibers have good acid and/or alkaline resistance and include beneficial ions, such that when leaching does occur, the leached ions have a positive effect in the particular application in which the fibers are used, such as in a battery separator. Also disclosed are certain applications for such glass fibers.

Certain embodiments of the glass compositions include, among other components, bismuth oxide. Certain embodiments of the glass composition include about 0.5–30% bismuth oxide of the composition by weight and silica oxide at about 54–70% of the composition by weight. Embodiments of the glass compositions may also include other components. For example zinc oxide can make up about 0.01–5% of the composition by weight.

DETAILED DESCRIPTION

Disclosed are glass compositions including, among other components, bismuth and/or bismuth compounds. The disclosed glass compositions are the compositions of the glass at the molten stage, which composition is the same as that of resulting glass fibers formed from such glass compositions. The disclosed glass compositions may vary from example "ingredient lists" for forming such glass compositions as certain ingredients may change form once melted, becoming a part of the glass composition. Example glass composition ingredient lists are set forth below with the discussion of example methods for making particular embodiments of the disclosed glass compositions.

Embodiments of the disclosed glass compositions may comprise one or more of the following components within, e.g., ranges set forth in Table 1.

TABLE 1

| Glass Composition Component | Weight Percent |
| --- | --- |
| $SiO_2$ | 54–70 wt % |
| $Al_2O_3$ | 1–5 wt % |
| $Bi_2O_3$ | 0.5–30 wt % |
| CaO | 3–7 wt % |
| MgO | 1–5 wt % |
| $B_2O_3$ | 4–9 wt % |
| $K_2O$ | 0–3 wt % |
| $Na_2O$ | 9–20 wt % |
| NiO | 0–2 wt % |
| ZnO | 0–5 wt % |
| BaO | 0–5 wt % |
| $Ag_2O$ | 0–1 wt % |
| $Li_2O$ | 0–1 wt % |
| $F_2$ | 0–1 wt % |

Further embodiments of the disclosed glass compositions may comprise one or more of the following components within, e.g., ranges set forth in Table 2.

TABLE 2

| Glass Composition Component | Weight Percent |
|---|---|
| $SiO_2$ | 56–69 wt % |
| $Al_2O_3$ | 2–4 wt % |
| $Bi_2O_3$ | 1–15 wt % |
| CaO | 3–6 wt % |
| MgO | 2–4 wt % |
| $B_2O_3$ | 4–7 wt % |
| $K_2O$ | 0.1–1.5 wt % |
| $Na_2O$ | 12–18 wt % |
| NiO | 0–1 wt % |
| ZnO | 0–3 wt % |
| BaO | 0–2 wt % |
| $Ag_2O$ | 0–0.1 wt % |
| $Li_2O$ | 0–0.3 wt % |
| $F_2$ | 0–0.8 wt % |

Particular embodiments of the glass compositions may comprise, for example, the components as set forth in Table 3.

TABLE 3

| Glass Composition Component | C-1 | C-2 | C-3 | C-4 | C-5 | C-6 | C-7 |
|---|---|---|---|---|---|---|---|
| $SiO_2$ | 64 | 63.6 | 59.8 | 59.5 | 56.7 | 68.5 | 68.5 |
| $Al_2O_3$ | 3.4 | 3.3 | 3.2 | 3.2 | 3 | 3.8 | 3.8 |
| CaO | 5.5 | 5.6 | 5.1 | 4.8 | 4 | 5.7 | 5.7 |
| MgO | 2.7 | 2.6 | 2.4 | 2.0 | 2.4 | 2.8 | 2.8 |
| $B_2O_3$ | 5.4 | 5.1 | 4.7 | 4.5 | 4.5 | 4.7 | 4.7 |
| $K_2O$ | 0.8 | 0.7 | 0.6 | 0.7 | 0.7 | 1.8 | 1.8 |
| $Na_2O$ | 16 | 14.7 | 14.3 | 13.4 | 12 | 11.9 | 11.9 |
| ZnO | 0.05 | 2.0 | 0.01 | 2.0 | 1.9 | 2* | 0 |
| BaO | 0.05 | 0.02 | 0.01 | 0.01 | 0 | | |
| $F_2$ | 0.6 | 0.6 | 0.6 | 0.6 | 0 | 0.8 | 0.8 |
| $Li_2O$ | 0.0009 | 0.008 | 0.007 | 0.000 | 0.000 | | |
| $Bi_2O_3$ | 1.8 | 1.8 | 9.3 | 9.3 | 14.9 | 2* | 10* |
| $Fe_2O_3$ | 0.05 | 0.05 | 0.05 | 0.05 | 0.05 | BDL | BDL |
| $Cr_2O_3$ | <0.0000 | <0.000 | 0 | 0 | 0 | BDL | BDL |
| $TiO_2$ | 0.025 | 0.021 | 0.024 | 0.025 | 0.019 | BDL | BDL |
| $ZrO_2$ | 0.004 | 0.002 | 0.003 | 0.003 | 0.002 | BDL | BDL |

Amounts in wt % over 100%

The disclosed glass compositions can be formulated using a variety of sources for each desired component. For example, the following glass composition components can be obtained from the sources listed in Table 4.

TABLE 4

| Glass Composition Component | Example Source | Source Composition |
|---|---|---|
| $SiO_2$ | Sand (or Silica) | Sand contains 99.4% silica, 0.25% alumina; Silica contains 99.9% silica |
| $Al_2O_3$ | Syenite | $SiO_2$, $Al_2O_3$, $K_2O$, $Na_2O$, CaO |
| CaO | Burnt Dolomite (or Fluorspar) | CaO*MgO, $CaF_2$ |
| MgO | Burnt Dolomite | CaO*MgO |
| $B_2O_3$ | Borax | $Na_2B_4O_7 \cdot 5H_2O$ |
| $K_2O$ | Syenite | $K_2CO_3 \cdot 1.5H_2O$ |
| $Na_2O$ | Soda Ash or Borax | $Na_2CO_3$ $Na_2B_4O_7 \cdot 5H_2O$ |
| ZnO | Zinc oxide | ZnO |
| BaO | Barium carbonate | $BaCO_3$ |
| $F_2$ | Fluorspar | $CaF_2$ |
| $Li_2O$ | impurity | |
| $Bi_2O_3$ | Bismuth oxide | $Bi_2O_3$ |
| $Fe_2O_3$ | impurity | Typically from sand, syenite and dolomite |
| $Cr_2O_3$ | impurity | Same |
| $TiO_2$ | impurity | Same |
| $ZrO_2$ | impurity | Furnace refractory materials |

Particular exemplary embodiments of the disclosed glass compositions and ingredients for forming the same are listed in Table 5. Clearly, different sources, amounts, and combinations of glass composition components can be used to produce the glass compositions disclosed herein.

TABLE 5

| Glass Comp Component | Source 1 and wt % | Glass Comp 1 | Source 2 wt % | Glass Comp 2 | Source 3 wt % | Glass Comp 3 | Source 4 wt % | Glass Comp 4 | Source 5 wt % | Glass Comp 5 |
|---|---|---|---|---|---|---|---|---|---|---|
| $SiO_2$ | Sand (and syenite) 50.0 | ~64 | 50 | 63.6 | 46.9 | 59.8 | 47.0 | 59.5 | 45.2 | 56.7 |
| $Al_2O_3$ | Syenite 12.3 | 3.43 | 12.0 | 3.3 | 11.7 | 3.2 | 11.8 | 3.2 | 11.1 | 3 |
| $Na_2O$ | Soda ash 18.0 (and borax) | 16.26 | 16.9 | 14.7 | 16.7 | 14.3 | 15.5 | 13.4 | 13.6 | 12 |
| $B_2O_3$ | See above | 5.37 | 9.7 | 5.1 | 9.6 | 4.7 | 8.9 | 4.5 | 8.5 | 4.5 |

TABLE 5-continued

| Glass Comp Component | Source 1 and wt % | Glass Comp 1 | Source 2 wt % | Glass Comp 2 | Source 3 wt % | Glass Comp 3 | Source 4 wt % | Glass Comp 4 | Source 5 wt % | Glass Comp 5 |
|---|---|---|---|---|---|---|---|---|---|---|
| CaO | Dolomite 6.5 (and fluorspar) | 5.47 | 6.3 | 5.6 | 5.8 | 5.1 | 4.9 | 4.8 | 6.2 | 4 |
| MgO | Dolomite (see above) | 2.72 | See above | 2.6 | See above | 2.4 | See above | 2.0 | See above | 2.4 |
| $K_2O$ | Syenite (see above) | 0.811 | See above | 0.7 | See above | 0.6 | See above | 0.7 | See above | 0.7 |
| BaO | Barium carbonate | 0.0517 | 0 | 0 | 0 | 0 | 0 | 0 | 0 | 0 |
| ZnO | Zinc oxide | 0.0477 | 1.8 | 2.0 | 0 | 0.01 | 1.8 | 1.95 | 1.6 | 2.0 |
| $Bi_2O_3$ | Bismuth oxide 1.6 | n/a | 1.6 | 1.8 | 8.4 | 9.3 | 8.5 | 9.3 | 13.8 | 14.9 |
| $Fe_2O_3$ | Impurity from sand, syenite and dolomite | 0.05 | Impurity | | Impurity | | Impurity | | Impurity | |
| $F_2$ | Fluorspare 1.9 | n/a | 1.9 | 0.6 | 1.6 | 0.55 | 2.1 | 0.54 | 0 | 0.53 |
| $Cr_2O_3$ | Impurity | 0.0000 | Impurity | | Impurity | | Impurity | | Impurity | |
| $TiO_2$ | Impurity | 0.0246 | Impurity | | Impurity | | Impurity | | Impurity | |
| $ZrO_2$ | Impurity | 0.0043 | Impurity | | Impurity | | Impurity | | Impurity | |
| $Li_2O$ | Impurity | 0.0009 | Impurity | | Impurity | | Impurity | | Impurity | |

Embodiments of the disclosed glass compositions may contain various combinations of the disclosed components listed above. Each of the disclosed glass compositions, however, include a certain amount of bismuth, typically in the form of an oxide, present in an amount of from about 0.5 wt % to about 30 wt % $Bi_2O_3$. Good results have been obtained with a bismuth component present in the composition at from about 1 wt % to about 15 wt % $Bi_2O_3$. It is possible that there would be negligible amount of reduction of $Bi_2O_3$ into metallic form. However, whatever form of bismuth is used for the glass composition, the raw bismuth material will turn into bismuth oxide upon melting of the composition.

Alone, $Bi_2O_3$ will not form glass. Bismuth oxide may be used as part of a binary glass composition. For example, bismuth oxide can be added to $SiO_2$ in a concentration up to about 40 mol %. $Bi_2O_3$ forms glass with several other oxides as well, for example $K_2O$. $Bi_2O_3$ acts in a glass composition in a manner similar to $B_2O_3$, $Al_2O_3$, $La_2O_3$ PbO, in that it decreases glass melting temperature, glass viscosity, and allows fiberization of the glass at lower temperatures. Bismuth oxide structural elements are incorporated into the glass matrix and act to strengthen the resulting glass structure, e.g., glass fibers.

In addition, bismuth oxide acts to decrease the glass softening point and melting temperatures (as discussed below and shown in Table 8). Addition of about 1% $Bi_2O_3$ decreases the softening point by about 2° F. Addition of about 1% $Bi_2O_3$ decreases the melting temperature by about 4° F. The fiberization temperature, i.e., the temperature at which the glass composition viscosity is about 1000 poise is also decreased in certain embodiments of the glass compositions. Particular glass composition embodiments exhibit a fiberization temperature of about equal to or lower than 2000° F. (about 1093° C.) and certain embodiments exhibit a fiberization temperature of about equal to or lower than from about 1800 to about 2050° F. (from about 982° C. to about 1120° C.). Glass composition embodiments having from about 2 to 10 wt % $Bi_2O_3$ decrease the fiberization temperatures of the glass compositions by about 50° F. to about 100° F. (about 10° C. to about 38° C.).

Glass compositions including the levels of $Bi_2O_3$ indicated also improve the performance of glass fibers formed into hand sheets. Testing of such hand sheets indicates that certain embodiments of the glass fibers disclosed will produce superior battery separators or filter media. That is, such applications of the disclosed glass fibers are relatively easy to manufacture and have the tensile, elongation, basis weight, water wicking characteristics and other basic characteristics similar to or better than what is presently available with commercial fibers (such as EF M-glass illustrated in Tables 6 and 7 or JM 253 glass (available from, e.g., Johns Manville Corporation and illustrated in Table 6)). Accordingly, certain embodiments of the disclosed glass compositions do not compromise major media physical characteristics needed of glass fibers formed thereof but instead additionally provide enhanced performance due to particular enhanced or new glass properties, e.g., Bi ion leaching that decreases off gassing in battery applications.

Further, particular embodiments of the disclosed bismuth-containing glass compositions have increased devitrification resistance so that they do not become crystalline during the fiberization process. Glass compositions having $Bi_2O_3$ in the disclosed ranges showed higher resistance to devitrification (see Table 7). Modified borosilicate glass, i.e., labeled as M-glass in the Table 7 is a man-made vitreous fiber as published by the Nomenclature Committee of TIMA Inc. 91, 93, incorporated herein by reference. This glass composition was used as a reference to determine effects of additions of $Bi_2O_3$ and ZnO to a glass composition. The M-glass batch (mixture of all raw materials) was formed and then divided into three parts. A first glass composition labeled "M glass" as shown in Table 7 was formed. A second glass composition was formed by adding further components including about 2 wt % ZnO and about 2 wt % $Bi_2O_3$ and a third glass composition was formed by adding about 10 wt % $Bi_2O_3$, thereby forming two particular embodiments of the disclosed glass compositions.

Bismuth ions in glass fibers formed from the disclosed glass compositions will also act to improve battery performance and increase battery life (as discussed below). The amount of bismuth desirable in the glass compositions is calculated so that leaching does not compromise the structural integrity of the resulting glass fibers over time. In particular applications it is desirable to have some bismuth ions (or other ions as discussed) leach into solution but the leaching should not lead to fall fiber dissolution during, for example, battery operation. Glass fibers formed from glass compositions having from about 0.5 to about 30% bismuth oxide provide sufficient bismuth ion leaching such that the leaching does not compromise the structural integrity of the resulting glass fibers over time but sufficient ions are leached to limit or prevent hydrogen gassing in batteries. Glass fibers formed from alternative embodiments of the glass compositions including from about 1 to about 15% bismuth oxide also provide sufficient bismuth ion leaching such that the leaching does not compromise the structural integrity of the resulting glass fibers over time but sufficient ions are leached to limit or prevent hydrogen gassing. This is especially true in valve regulated (sealed) lead acid batteries. Hydrogen gassing causes water loss, which shortens battery life and reduces performance.

The addition of $Bi_2O_3$ as indicated as well as from about 1 to about 4 wt % ZnO also minimizes hydrogen gassing of VRLA batteries under float duty. Float duty is the low-rate charge used to maintain a battery in a fully charged condition in a standby application, as is known to those persons skilled in the art. ZnO in the glass compositions and resulting glass fibers formed therefrom also significantly improves water and acid durability of the glass fibers, significant for various glass fiber applications such as battery and filter uses.

Some embodiments of the glass compositions and glass fibers may include NiO or other suitable Ni ion sources. For battery applications, Ni ions increase the charge acceptance of a negative plate of lead acid batteries. On the other hand Ni may increase gassing. This negative effect may be suppressed by addition of Bi, Zn and Ag ions to the glass compositions.

Typically silica is the main glass component. Silica forms a stable, durable glass lattice and provides particular structural properties to the glass composition. In particular embodiments of the disclosed glass compositions $SiO_2$ is present at a weight % of from about 54% to about 70%. In other embodiments of the disclosed glass compositions $SiO_2$ is present at a weight % of from about 56 % to about 69% and yet in other embodiments of the disclosed glass compositions $SiO_2$ is present at a weight % of from about 62% to about 70%.

None of the other glass formers ($P_2O_5$, $B_2O_3$) can provide with sufficiently durable (and cheap) glass. That is, theoretically these oxides can substitute silica, but they are expensive and glass compositions formed thereof will likely be less durable—not sufficiently withstanding humid or acidic environments.

Alumina in a glass composition affects the glass water and acid durability. Thus, alumina may improve an embodiment of the disclosed glass fiber's performance in a humid atmosphere when used, for example, in filter applications. On the other hand, a relatively high alumina content can significantly decrease the Kdis (biological dissolution coefficient) of the glass fiber; making the glass less bio-degradable. A useful alumina concentration may be from about 2% to about 4%.

Calcium oxide (CaO) and magnesium oxide (MgO) may be present in particular glass composition embodiments to further stabilize the glass network and provide the glass with particular advantageous structural properties. CaO acts to decrease the viscosity of the glass composition and MgO acts to further slow the crystallization rate. CaO and MgO increase glass fiber biological solubility. Particular embodiments of the disclosed glass compositions include these oxides in the advantageous ratio, CaO to MgO, of about 3:2 (i.e., a molar ratio of about 1:1). Other particular embodiments include the oxides in the following amounts: CaO at from about 3 wt % to about 6 wt % and MgO at from about 2 wt % to about 4 wt %.

Certain embodiments of the glass compositions include sodium oxide ($Na_2O$) and/or potassium oxide ($K_2O$). These particular oxides may be present to aid in the decrease glass melting temperature, glass viscosity, and, respectively, to allow fiberization of the glass at lower temperatures. Addition of $Na_2O$ and $K_2O$ to some extent may aid in increases the glass durability in acids. On the other hand, both oxides may act to increase glass water and biological solubility. Embodiments of the glass compositions including both oxides may provide further advantages due to the polyalkali effect (synergistic effect). Addition of $K_2O$ may also aid in the decrease of a glass composition's propensity to the crystallization.

Certain embodiments of the glass compositions include boron oxide ($B_2O_3$) to aid in the lowering of glass melting temperature, aid in the reduction of glass viscosity, and to enhance resulting glass fiber elasticity. In addition, boron oxide may be included in the glass composition to significantly increase glass fiber biosolubility without deterioration of glass durability in water and in acid. Particular embodiments of the glass compositions include from about 4 wt % to about 7 wt % boron oxide.

Certain embodiments of the glass compositions include barium oxide (BaO) to aid in the moisture resistance of resulting glass fibers and may have a positive affect on biological degradability of the resulting glass fibers.

Certain embodiments of the glass compositions include fluorine (F2) and lithium oxide ($Li_2O$) in relatively small amounts (for example, less that about 1 wt %) to aid in the decrease of the glass melting temperature, to improve melt fining, and to aid in the lowering of the glass viscosity. Typically $Li_2O$ is present only as an impurity. Certain embodiments of the glass compositions include iron oxide in trace quantities since it is also normally introduced as an impurity in the SiO2, Al2O3, CaO, and/or MgO batch materials. A typical content of iron in a glass composition is from about 0.05 wt % to about 0.1 wt %. Other typical impurities include SrO, and/or MnO. Glass composition embodiments may include such oxides in amounts less than about 0.1 wt %. In general, the disclosed glass compositions include less than about 0.05 wt % TiO2 (from the total amount of glass) and CoO less than 0.01 wt %. Both CoO and TiO2 have negative influence on battery operations. If glass fibers (or a glass composition) have a blue tint, it is typically due to Co leaching from the rotary disc and in such cases the resulting glass fibers/products are typically rejected. In general, the disclosed glass compositions include less than about 0.05% $ZrO_2$. Although glass compositions may include as much as 0.3–0.4 wt %. $ZrO_2$, that particular component does not appear to have a negative impact on battery operations, but it does drastically change glass properties and thus most of the disclosed glass compositions include less than about 0.1 wt % $ZrO_2$.

One or more of the above-listed glass composition ingredients may have suitable substitutions as known to those of ordinary skill in the art. Alternative compounds and oxides may include for example, rubidium oxide as a substitute for $K_2O$. Another example may be the partial substitution of CaO with SrO or partial substitution of $Al_2O_3$ with $La_2O_3$.

The glass compositions as disclosed herein may be made by methods known to those persons of ordinary skill in the art. For example, an embodiment of the glass compositions disclosed herein may be prepared using chemical reagent-grade materials such as those listed in the tables above. The ingredients to form the desired glass compositions may be, e.g., added to a clay crucible and melted at about 1350° C. or lower depending upon the exact glass composition being formed, with about a one hour dwell time at maximal temperatures. The melted glass composition may then be poured into steel molds in the shape of disks. Glass discs may then be annealed at about 600° C. and then cooled to room temperature.

As discussed above, embodiments of the glass compositions disclosed have surprisingly relatively low softening points. Particular embodiments of the glass compositions have softening points of from about 1230° F. to about 1256° F. (from about 665.6° C. to about 680° C.). The softening point is the temperature at which the viscosity of a glass composition is 10 in power 7.6 poises ($\eta$=log 7.6). Particular embodiments of the glass compositions have glass softening points as shown in Table 7. As shown, an embodiment of the disclosed glass compositions having about 10 wt % $Bi_2O_3$ decreases the softening point of the glass to about 1267° F. (see, e.g., Table 7, Composition 7). Softening points of the disclosed glass compositions are lower than the commercially available glass compositions as illustrated in Table 7 wherein examples of existing glass compositions labeled "M-glass" and "JM 253" have typical conventional glass composition softening points, with M-glass having a softening point at about 1300° F. (704° C.) and JM 253 at about 1235° F. (668° C.).

Because particular embodiments of the presently disclosed glass compositions have lower softening points, the disclosed glass compositions melt faster and require less energy to be melted and fiberized. Lower melting and fiberization temperatures promise savings in equipment due to lower wear of parts contacting melted glass and lower energy costs. Glass softening points were determined by the Littleton method (per ASTM C-388, incorporated herein by reference).

Glass powder having a particle size in the range of from about 297 to about 590 µm (i.e., a particle fraction between mesh screen 30 and 50) was utilized to test certain of the glass compositions' properties. Because the process of making and testing glass microfibers is a long and expensive, before glass is fiberized. For screenings, the powder technique was used. Small amounts (e.g., about 1 pound) of particular glass compositions were melted and then cooled and crushed into a powder. Thus, there was a significant increase in the glass surface area. The testing included glass composition powders having particle sizes within a predetermined range. This method allows prediction of the fiber durability in different environments and solutions, namely acidic, neutral water, basic and in simulated lung fluid, eliminating time consuming and costly experimental glass fiberization processes.

TABLE 6

Weight of Loss in % for 1.4 µm Diameter Glass Fibers in Various Solutions

| Composition | Solution | | |
|---|---|---|---|
| | Acid | Water | Alkali |
| 1 | 4.50 | 4.42 | 10.27 |
| 2 | 2.61 | 2.44 | 14.91 |
| 3 | 3.55 | 2.17 | 13.59 |
| 4 | 2.80 | 2.13 | 16.34 |
| 5 | 3.12 | 1.79 | 15.20 |
| M-glass | 1.57 | 2.99 | 8.43 |
| JM 253 | 3.25 | 7.40 | n/a |

Certain embodiments of the glass compositions disclosed herein provide for lower fiberization temperatures. In general, the fiberization temperatures of the disclosed glass compositions are from about 1800° F. to about 2050° F. (about 982° C. to about 1120° C.) or about 100° F. (37.8° C.) lower than commercially available glass compositions.

Certain embodiments of the glass compositions disclosed herein provide relatively very low crystallization rates, an important technological property for glass fiberization. The crystallization rate is the speed of glass devitrification at specific temperatures or temperature ranges. Crystallization rates of particular embodiments of the glass compositions disclosed were evaluated by holding glass powder in a furnace at the following temperatures (in ° C.) for about two hour dwell periods: 1000, 950, 900, 875, 850, 825, 800, and 700. Results are shown in Table 7.

As shown in Table 6, particular embodiments of the disclosed glass compositions have surprisingly superior water durability as compared with commercially available glass compositions. For example, see Table 6 wherein representative commercially available glass compositions "M-glass" and "JM 253" glass have much lower durability in water as compared to disclosed compositions nos. 2–5. In addition, disclosed glass composition no. 2 has surprisingly superior tensile strength for 0.8 µm and 1.4 µm fibers, respectively, 4.3 and 3.3 pounds/inch when formed in hand sheets.

Also disclosed herein are glass fibers formed of the disclosed glass compositions. The glass compositions disclosed may be formed into, e.g., glass fibers using conventional methods and equipment. For example, the glass compositions may be fiberized by rotary, CAT, and/or flame blown processes. Glass fibers as disclosed herein may be formed from any of the multitude of embodiments of the disclosed glass compositions. Embodiments of the disclosed glass fibers have many potential applications. They may be used, for example, in various manners and locations in batteries, to form filters designed for air and/or liquid filtration, and as insulation material, (e.g., electrical and/or thermal insulation). The desired glass fiber composition and size is determined based on the intended use for the glass fibers, as would be known to a person of ordinary skill in the art. For example, to obtain glass fibers useful in both filter and battery applications disclosed glass composition 2 (see Table 3) may be formed into about 0.8 µm and 1.4 µm glass fibers Embodiments of the disclosed glass fibers typically exhibit a variety of advantageous properties. Such disclosed glass fibers have superior water and acid durability as indicated in Table 6 and superior tensile strength (hand sheets formed of such fibers showed tensile strength of about 4.3 and 3.3 pounds/inch, respectively). Such characteristics make these disclosed glass fibers suitable both for battery separators and filtration media. Certain embodiments also have relatively low biopersistance, meaning that inhaled fibers will dissolve and be eliminated more readily in the lungs. The biopersistance factor, as known to those skilled in the art, is measured by the Kdis of the glass fibers in simulated lung fluid. Certain embodiments of the glass fibers achieve a Kdis of less than about 150 ng/cm²h and other embodiments may exhibit Kdis values in the range of from about 50 to about 150 ng/cm² h.

Glass biosolubility has been tested on glass particles of size 75–106 μm made from disclosed glass composition embodiments 6 and 7 in Table 3. The particles passed through sieve 140 and remained on the sieve 200 were stored in vials with simulated lung fluid (SLF) for about 96 hours at about 37° C. in a shaker. The dissolution rate was again determined based on the leachate analysis performed with an ICP. Leaching rates were compared based on the levels of the leached ions in solution. Results are shown in Table 9. An embodiment of the glass composition having 10 wt % $Bi_2O_3$ doubled the glass biodissolution rate in simulated lung fluid. This indicates that a glass composition having $Bi_2O_3$ provides an increase in biosolubility without compromising other desirable properties of the glass composition.

Further, certain embodiments of the disclosed glass fibers including the levels of $Bi_2O_3$ indicated may also improve the performance of glass fibers formed therefrom because longer fibers can be produced. Certain embodiments of the glass fibers also show a significantly increased density as compared to equivalent glass fibers currently available. Accordingly, certain glass fiber products, such as glass fibers used in battery separators provide higher porosity rates in the separator because for the separator to have the same weight of glass fibers, less glass fibers are needed. The same would hold true for other glass fiber products such as filtration and insulation products where the weight of the fibers versus the amount of fibers needed is of concern. For example, certain embodiments of the disclosed glass fibers have density values from about 2.5 to about 2.8 g/cm³ as shown in Table 7.

TABLE 7

Glass Densities and Softening Points

| Composition No. | Glass density, g/cm³ | Softening point, F. | Crystallization rate |
|---|---|---|---|
| 1 | 2.5578 | 1252 | Slight surface crystallization- |
| 2 | 2.7004 | 1230 | Slight surface crystallization- |
| 3 | 2.573 | 1256 | Slight surface crystallization- |
| 4 | 2.7721 | 1238 | Slight surface crystallization- |
| 5 | 2.8039 | 1249 | Slight surface crystallization- |
| M-glass | 2.489 | 1300 | Surface and bulk crystallization |

Glass fiber embodiments having such density values means that hand sheets made from the same size glass fibers formed from the disclosed glass compositions having varying bismuth oxide concentrations will exhibit different specific surface areas and different air resistant values. For example, density values of from about 2.50 to about 2.85 are obtainable with certain embodiments of the presently disclosed glass fibers when bismuth oxide concentrations of the glass fibers are from about 1 to about 15 wt %. Density values were obtained by use of a Micromeritics AccuPyc 1330 picnometer according to the method set forth in the Micromeritics manual.

Embodiments of the glass fibers disclosed herein have specific surface areas (SSAs). Relatively low SSAs of certain glass fiber embodiments are important for glass fiber durability considerations. The larger SSA fibers' value, the smaller the fiber diameter. Different applications require glass fibers of different diameters and respectively different SSA values. SSA and fiber diameter values are inversely dependent. The larger the SSA the smaller the diameter of the fiber and the stronger the fibers when subjected to ambient atmosphere attack (e.g., humidity, acid, etc.). SSA values are especially important for glass fiber products having glass fibers of relatively large specific surface areas as larger surface areas can detrimentally affect the product. For example, ion leaching is a glass fiber surface phenomenon. The amount of ions lost from a glass fiber is proportional to the exposed surface area. Surface area considerations are typically greatest for glass fibers having diameters of less than about 5–7 μm but the SSA values of larger or smaller diameter glass fibers is also of importance. Certain embodiments of the disclosed glass fibers have SSA values of from about 1.1 to about 1.2 g/m³ for about 1.4 μm diameter fibers and 1.95 to about 2.0 g/m³ for about 0.8 μm diameter fibers.

SSA values of certain embodiments of the disclosed glass fibers were determined as set forth in EFCTM 157: Specific Surface Area Analysis using Argon, which is incorporated herein by reference. The apparatus used was a Micromeritics 2375 BET SSA analyzer.

As mentioned above, leaching of ions from glass fibers in various glass fiber products can be advantageous or detrimental to the product. For example, with glass fiber filter products leaching would be detrimental for a variety of reasons, such as disintegration of the fibers. Leaching of the glass fibers has a direct affect on the durability of the fibers. In addition to the affect of leaching on the durability requirements of glass fibers, other considerations depend on the applications for which glass fibers are used. For example, glass fibers used in battery separators preferably have low levels of leaching of certain metal oxide impurities (e.g., platinum oxide, iron oxide) that can have a detrimental effect on the life of the battery. On the other hand, certain ions (e.g., Bi, Ag, Ni, Cd, Ge, Sn, Zn) have positive effects on battery performance (as discussed above), so leaching of these ions may be beneficial. As discussed, these ions can reduce gassing, water loss and improve charge acceptance by a battery's negative plate.

The durability of glass fibers is typically determined by the leaching rate of the glass fibers in acid, neutral and alkaline conditions. Particular embodiments of the disclosed glass compositions in powder form were tested for leach rates in acidic environments. Leaching rates in acid were determined by analyzing leachates obtained by boiling 2.5 grams of glass fibers in 100 gms$H_2SO_4$ having a specific gravity of 1.26 g/cm³ for three hours. DI water (up to 250 ml) was added to the leachate. (See 8.2 ASTM 165, which is incorporated herein by reference.) Samples of the resulting solution were subjected to inductively coupled plasma atomic emission spectrometry (ICP-AES) model Perkin Elmer Optima 4300 DV to determine the amount of each element present in the leachate. Final leach rate results are shown in Tables 6, 8, and 10. The leach rates shown are averages of three sample tests per composition tested.

The acid leaching test showed that the glass composition embodiments tested have leaching rate within the range of current commercial glass fibers "408" made from "M-glass" glass (available from Evanite Fiber Corporation of Corval lis, Oreg.) and glass fibers "206" made from "253" glass (available from Johns Manville Company of Denver, Colo.). Leach rates of the embodiments of the disclosed glass compositions tested are closer to the Johns Manville glass fibers made out of "253 glass." All of the tested glass composition embodiments have approximately the same acid resistance with a slightly higher value shown for composition numbers 2, 4 and 5—the glass composition embodiments with ZnO and the glass compositions with the highest $Bi_2O_3$ concentration.

TABLE 8

Total Element Concentration (in ppm)/250 gms Solution - Leach Rate

| Composition Number* | In DI water | In acid | In Alkali ** |
|---|---|---|---|
| 1 | 158.6 | 230.9 | 58.3 |
| 2 | 118.2 | 210.3 | 54.0 |
| 3 | 136.7 | 239.6 | 76.8 |
| 4 | 108.6 | 233.2 | 78.2 |
| 5 | 99.9 | 193.5 | 82.0 |
| 408 (reference) | 107.4 | 110.3 | 30.7 |
| 206 (reference) | 209.1 | 234.7 | n/a |

*The composition numbers herein correspond to those set forth above in Table 3
** This data does not contain sodium and potassium ions, because of their very high concentration in leaching fluid.

Particular embodiments of the disclosed glass compositions in powder form were tested for leach rates in water or neutral environments to determine the glass fibers' moisture and water resistance values (See 8.2.TM. 166 incorporated herein by reference). Leaching rates in DI water were determined by analyzing leachates obtained by boiling 2.5 gms of glass fibers in 250 gms of DI water for 3 hours. Samples of the resulting solution were subjected to inductively coupled plasma atomic emission spectrometry (ICP-AES) model Perkin Elmer Optima 4300 DV to determine the amount of each element present in the leachate. Final results as shown in Tables 8 and 9 are averages of three sample tests per composition tested. The tested glass composition embodiments illustrate that the resulting glass fibers have water durability performance values that are compatible with the commercially available fibers (i.e., in the range of 100 to 160 with weight losses below about 5 wt %). Water durability performance is better for glass compositions having higher ZnO and $Bi_2O_3$ content.

Particular embodiments of the disclosed glass compositions in powder form were tested for leach rates in alkaline environments. Leaching rates in a base were determined by analyzing leachates obtained by holding about 2.5 grams of glass fibers in 100 ml of 30% KOH at 125° F. for 3 hour. DI water (up to 250 ml) was added to the leachate. Resistance of fiber to acid and water were tested per EFCTM 120: Extractable Metallic Impurities of Recombinant Battery Separator Mat (RBSM) and Glass Fibers. Alkalinity is tested per EFCTM 119, incorporated herein by reference. Such conditions compare are equivalent to 5 years in a battery. Leachates were tested per EFCTM 120.

Samples of the resulting solution were subjected to inductively coupled plasma atomic emission spectrometry (ICP-AES) model Perkin Elmer Optima 4300 DV to determine the amount of each element present in the leachate. Final results shown in Tables 8 and 9 are averages of three sample tests per composition tested. Additional leachate tests results for specific embodiments are shown in Table 10. Increased glass fiber alkali resistance is beneficial for glass fibers used in a battery separator because during initial wrapping of the plates, the plates could be at a pH>7. In addition, prior to formation of the battery, the density, or specific gravity of the acid electrolyte can approach that of water and result in alkaline conditions at plate. In Table 10, Sample IDs designating compositions 1–5 are those compositions shown in Table 3. The sample ID indicator "08" indicates a glass fiber diameter of 0.8 μm, and "12" indicates a glass fiber diameter of 1.4 μm. The element concentrations are in ppm.

A glass composition having about 10 wt % of $Bi_2O_3$ (composition 7, Table 7) has a decreased glass chemical durability (10–20%) in acid (1.26 $g/cm^3$ H2SO4), improved glass durability in water, and significantly increased alkali resistance. Surprisingly, the glass leaching rate of composition 7 in 0.5 NaOH+0.5 $Na_2CO_3$ dropped almost three times (see Table 9). However the same phenomenon was not shown in concentrated KOH (30%) for glass fibers made out of compositions 1–5. The 30% KOH solution appeared equally destructive for all compositions tested. Addition of 2% of $Bi_2O_3$ and 2% ZnO (composition 6, Table 10) did not significantly change the glass properties. However, such a composition would be very efficient for battery separators due to fact that it contains both ZnO and $Bi_2O_3$.

TABLE 9

| Glass properties | Conventional Glass | Composition 6 | Composition 7 |
|---|---|---|---|
| Glass softening point ° F. | 1300 (704° C.) | 1296 (702° C.) | 1267 (686° C.) |
| Leached in acid, in ppm | 18 | 25 | 30 |
| Leached in DI water, ppm | 63 | 70 | 53 |
| Leached in alkaline solution, ppm | 404 | 438 | 162 (!) |
| Leached in simulated lung fluid(SLF), in ppm in 96 hours | 27 | 29 | 40.2 |
| Estimated Kdis, $ng/cm^2 * h$ | 25 | 30 | 60 |
| Devitrification | Surface and bulk crystallization | Slight surface crystallization | Slight surface crystallization |

Comments:
For all three compositions prepared the same batch, then to composition 6 added 2 wt % of ZnO and 2 wt % $Bi_2O_3$ (% from initial batch weight).
For composition 7 added additional 10 wt % of $Bi_2O_3$. Glasses melted at maximal temperature 1350° C. with dwell time 1 hour at maximal temperature.

TABLE 10

| | Leach Test Results (ppm) | | | | | | |
|---|---|---|---|---|---|---|---|
| Sample | Al | B | Ba | Bi | Ca | Fe | K |
| Composition 1 (UAC) | | | | | | | |
| 08UAC1 | 0.5811 | 4.493 | 0.0657 | 0.1601 | 1.828 | 0.0039 | 1.789 |
| 08UAC2 | 0.6443 | 4.142 | 0.0571 | 0.1781 | 2.134 | 0.0031 | 1.689 |
| 08UAC3 | 0.6031 | 4.034 | 0.1208 | 0.1588 | 2.12 | 0.0027 | 1.731 |
| 08UAC4 | 0.5672 | 3.423 | 0.1154 | 0.1925 | 2.247 | 0.0026 | 1.338 |
| 12UAC5 | 0.5593 | 4.06 | 0.1459 | 0.1862 | 2.154 | 0.0021 | 1.556 |
| 12UAC6 | 0.5781 | 3.292 | 0.084 | 0.2359 | 2.516 | 0.0021 | 1.324 |
| Composition 3 (UBC) | | | | | | | |
| 08UBC1 | 0.8123 | 3.76 | 0.0383 | 0.7847 | 1.283 | 0.0032 | 1.393 |
| 08UBC2 | 0.8123 | 3.813 | 0.1702 | 1.012 | 1.159 | 0.0031 | 1.508 |
| 08UBC3 | 0.7771 | 3.769 | 0.0482 | 0.7589 | 1.195 | 0.0022 | 1.54 |
| 12UBC1 | 0.6646 | 2.518 | 0.0245 | 0.8038 | 1.312 | 0.0023 | 1.07 |
| 12UBC2 | 0.6218 | 2.34 | 0.0853 | 0.6792 | 1.243 | 0.0023 | 1.06 |
| 12UBC3 | 0.5995 | 1.959 | 0.019 | 0.8942 | 1.169 | 0.0106 | 0.945 |
| Composition 2 (UCC) | | | | | | | |
| 08UCC1 | 0.4788 | 3.931 | 0.3222 | 0.1758 | 1.83 | 0.0039 | 1.501 |
| 08UCC2 | 0.4575 | 3.931 | 0.1094 | 0.1783 | 1.752 | 0.0023 | 1.463 |
| 08UCC3 | 0.4494 | 4.188 | 0.0584 | 0.162 | 1.668 | 0.0027 | 1.634 |
| 12UCC1 | 0.3404 | 2.937 | 0.071 | 0.1945 | 2.028 | 0.0019 | 1.101 |
| 12UCC2 | 0.3354 | 2.872 | 0.0596 | 0.1706 | 1.882 | 0.0024 | 1.061 |
| 12UCC3 | 0.351 | 2.968 | 0.039 | 0.2161 | 2.01 | 0.0023 | 1.117 |
| Composition 4 (UDC) | | | | | | | |
| 08UDC1 | 0.6049 | 3.918 | 0.1442 | 0.5719 | 1.007 | 0.0022 | 1.173 |
| 08UDC2 | 0.5796 | 3.568 | 0.3653 | 0.5405 | 0.8491 | 0.0018 | 1.114 |
| 08UDC3 | 0.6161 | 3.816 | 0.0882 | 0.6517 | 0.8607 | 0.0018 | 1.311 |
| 12UDC1 | 0.5379 | 2.679 | 0.088 | 0.7143 | 0.9878 | 0.0013 | 0.902 |
| 12UDC2 | 0.522 | 2.432 | 0.1212 | 0.6729 | 0.9342 | 0.0017 | 0.8446 |
| 12UDC3 | 0.5019 | 2.45 | 0.084 | 0.5166 | 0.9291 | 0.0011 | 0.8686 |
| Composition 5 (UEC) | | | | | | | |
| 08UEC1 | 0.6448 | 2.536 | 0.0132 | 1.135 | 0.528 | 0.004 | 1.074 |
| 08UEC2 | 0.5907 | 2.126 | 0.0114 | 1.066 | 0.459 | 0.0034 | 0.8875 |
| 08UEC3 | 0.5718 | 1.974 | 0.0089 | 0.9864 | 0.4492 | 0.0027 | 0.9015 |

| Sample | Mg | Na | Ni | Si | Ti | Zn |
|---|---|---|---|---|---|---|
| Composition 1 (UAC) | | | | | | |
| 08UAC1 | 0.0989 | 89.89 | 0.0008 | 59.93 | 0.0013 | 0.0186 |
| 08UAC2 | 0.1084 | 87.77 | 0 | 61.34 | 0.0011 | 0.0135 |
| 08UAC3 | 0.0864 | 89.44 | −0.0003 | 60.49 | 0.001 | 0.0082 |
| 08UAC4 | 0.0875 | 69.5 | 0 | 51.17 | 0.0011 | 0.026 |
| 12UAC5 | 0.0785 | 73.61 | −0.0005 | 50.7 | 0.0009 | 0.0055 |
| 12UAC6 | 0.0893 | 64.18 | 0.0002 | 47.85 | 0.0009 | 0.0122 |
| Composition 3 (UBC) | | | | | | |
| 08UBC1 | 0.123 | 80.26 | −0.0005 | 50.47 | 0.0016 | 0.0041 |
| 08UBC2 | 0.1365 | 79.88 | −0.0008 | 49.33 | 0.0012 | 0.0027 |
| 08UBC3 | 0.0928 | 77.27 | −0.0001 | 48 | 0.001 | 0.0004 |
| 12UBC1 | 0.0914 | 55.29 | 0.0001 | 36.97 | 0.0011 | −0.0001 |
| 12UBC2 | 0.0835 | 53.45 | −0.0013 | 35.06 | 0.0009 | −0.0019 |
| 12UBC3 | 0.0699 | 48.53 | 0.001 | 32.03 | 0.0008 | 0.0132 |
| Composition 2 (UCC) | | | | | | |
| 08UCC1 | 0.0923 | 71.67 | 0.0008 | 36.43 | 0.0025 | 0.1463 |
| 08UCC2 | 0.0849 | 72.58 | 0.0004 | 35.49 | 0.0008 | 0.1313 |
| 08UCC3 | 0.0876 | 76.02 | 0.0007 | 37.36 | 0.001 | 0.1372 |
| 12UCC1 | 0.0603 | 50.08 | 0.0004 | 20.13 | 0.0006 | 0.1057 |
| 12UCC2 | 0.0714 | 49.45 | 0.0001 | 18.61 | 0.0007 | 0.1198 |
| 12UCC3 | 0.065 | 49.9 | 0.0005 | 17.73 | 0.0007 | 0.1172 |

TABLE 10-continued

| Leach Test Results (ppm) | | | | | | |
|---|---|---|---|---|---|---|
| Composition 4 (UDC) | | | | | | |
| 08UDC1 | 0.0687 | 60.61 | −0.0005 | 39.16 | 0.0014 | 0.135 |
| 08UDC2 | 0.0649 | 59.45 | 0.0007 | 37.66 | 0.0005 | 0.1244 |
| 08UDC3 | 0.0635 | 65.71 | −0.001 | 40.95 | 0.0005 | 0.1282 |
| 12UDC1 | 0.0426 | 45.04 | −0.001 | 30.94 | 0.0002 | 0.0845 |
| 12UDC2 | 0.0452 | 43.88 | −0.0006 | 31.61 | 0.0002 | 0.091 |
| 12UDC3 | 0.039 | 43.48 | −0.0007 | 30.62 | 0.0002 | 0.088 |
| Composition 5 (UEC) | | | | | | |
| 08UEC1 | 0.242 | 52.82 | −0.0015 | 43.19 | 0.0007 | 0.3448 |
| 08UEC2 | 0.1685 | 44.96 | −0.0018 | 36.25 | 0.0007 | 23.53 |
| 08UEC3 | 0.1646 | 45.18 | −0.0011 | 36.79 | 0.0004 | 0.2391 |

As mentioned above, the disclosed glass compositions and fibers can be used in many applications. In particular cases, the glass fibers are used in battery separators. Battery separators may be used in various batteries, such as lead-acid batteries. Lead acid batteries include a plurality of electrode plates. The plates are arranged to establish alternating positive and negative electrodes. A battery separator may be disposed between each pair of electrodes. The separators may be formed of insulating material and are used, in part, to prevent metallic deposits in the battery from forming short circuits between the electrode plates. The separator is porous, however, to the battery electrolyte so that current can pass from one plate to another. Particular examples of battery separators and methods of making and using them are disclosed in U.S. Pat. Nos. 5,180,647; 5,091,275; 4,237,083; 4,113,927; 3,989,579; 3,845,737; and 3,450,571, which are all incorporated by reference herein.

In examples of battery separators comprising the disclosed glass compositions, glass fibers made from the disclosed glass compositions are used to form the battery separator. The glass fibers may be used to form what is commonly known as an absorptive glass mat separator, which typically is comprised of glass fibers of varying length and diameter. In other cases the battery separator comprises a mat formed of the disclosed glass fibers that is impregnated with a binder that is an aqueous mixture of colloidal silica particles and a sulfate salt as described in U.S. Pat. No. 5,091,275 (the '275 patent). As explained in the '275 patent, the separator can be made by forming the glass mat on a conventional paper making machine (such as a Fourdrinier machine) and then exposing the mat to the binder in an impregnating bath of an aqueous mixture of the binder, followed by drying of the mat and compression to the desired separator thickness.

Whereas the disclosed glass compositions, glass fibers and applications for the same have been described with reference to multiple embodiments and examples, it will be understood that the invention is not limited to those embodiments and examples. On the contrary, the invention is intended to encompass all modifications, alternatives, and equivalents as may be included within the spirit and scope of the invention as defined by the appended claims and as disclosed in the specification.

We claim:

1. A substantially non-crystalline glass fiber comprising about 0.5–30 wt % bismuth oxide, about 54–70 wt % silica, equal to or less than about 20 wt % sodium oxide, and

| | Weight Percent (about) |
|---|---|
| $Al_2O_3$ | 1–5 wt % |
| CaO | 3–7 wt % |
| MgO | 1–5 wt % |
| $B_2O_3$ | 4–9 wt % |
| $Na_2O$ | 9–20 wt % |
| $K_2O$ | 0.0001–3 wt % |
| NiO | 0.0001–2 wt % |
| BaO | 0.0001–5 wt % |
| $Ag_2O$ | 0.0001–1 wt % |
| $F_2$ | 0.0001–1 wt %. |

2. A glass fiber comprising about 0.5–30 wt % bismuth oxide and about 54–70 wt % silica, and a CaO to MgO weight percent ratio of about 3:2.

* * * * *

UNITED STATES PATENT AND TRADEMARK OFFICE
CERTIFICATE OF CORRECTION

PATENT NO. : 7,160,824 B2
APPLICATION NO. : 10/630546
DATED : January 9, 2007
INVENTOR(S) : George Zguris et al.

Page 1 of 1

It is certified that error appears in the above-identified patent and that said Letters Patent is hereby corrected as shown below:

Column 1, lines 26 and 27, "working temperatures (about 1427°C.)." should read --working temperatures (temperature ranges between glass viscosity 100 and 10000 poise) of about 2600°F (about 1427°C).--.

Column 8, line 44, "(F2)" should read --($F_2$)--.

Column 8, line 51, "SiO2, Al2O3" should read --$SiO_2$, $Al_2O_3$--.

Column 8, line 57, "TiO2" should read --$TiO_2$--.

Column 8, line 29, "TiO2" should read --$TiO_2$--.

Column 14, line 11, "at plate" should read --at the plate--.

Signed and Sealed this

Tenth Day of February, 2009

JOHN DOLL
*Acting Director of the United States Patent and Trademark Office*